(12) United States Patent
Loewenstein et al.

(10) Patent No.: US 10,999,401 B2
(45) Date of Patent: May 4, 2021

(54) MULTIPLE ON-DIE COMMUNICATION NETWORKS

(71) Applicant: Oracle International Corporation, Redwood Shores, CA (US)

(72) Inventors: Paul Loewenstein, Palo Alto, CA (US); Robert P. Masleid, Monte Sereno, CA (US); Stephen Phillips, Los Gatos, CA (US); Thirumalai Swamy Suresh, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 6 days.

(21) Appl. No.: 16/167,312

(22) Filed: Oct. 22, 2018

(65) Prior Publication Data

US 2019/0058779 A1    Feb. 21, 2019

Related U.S. Application Data

(63) Continuation of application No. 14/336,037, filed on Jul. 21, 2014, now Pat. No. 10,110,700.

(60) Provisional application No. 61/972,886, filed on Mar. 31, 2014.

(51) Int. Cl.
| | |
|---|---|
| *G06F 15/16* | (2006.01) |
| *H04L 29/08* | (2006.01) |
| *G06F 12/0813* | (2016.01) |
| *G06F 15/78* | (2006.01) |
| *H04L 12/801* | (2013.01) |

(52) U.S. Cl.
CPC .......... *H04L 67/32* (2013.01); *G06F 12/0813* (2013.01); *G06F 15/78* (2013.01); *H04L 47/10* (2013.01); *H04L 67/1097* (2013.01); *H04L 67/2842* (2013.01)

(58) Field of Classification Search
CPC . H04L 67/32; H04L 67/2842; H04L 67/1097; H04L 47/10; G06F 15/78; G06F 12/0813
USPC .................................................. 709/213, 218
See application file for complete search history.

(56) References Cited

U.S. PATENT DOCUMENTS

| | | | |
|---|---|---|---|
| 5,146,348 A  * | 9/1992 | Kaneyama | ......... H04N 1/00915 |
| | | | 358/296 |
| 7,562,174 B2 * | 7/2009 | Danilak | .................... G06F 3/14 |
| | | | 710/305 |
| 7,965,725 B2 | 6/2011 | Langevin et al. | |

(Continued)

OTHER PUBLICATIONS

Kim et al., "A 118.4 GB/s Multi-Casting Network-on-Chip With Hierarchical Star-Ring Combined Topology for Real-Time Object Recognition", IEEE Journal of Solid-State Circuits, vol. 45, No. 7, Jul. 2010, 11 pages. [downloaded Aug. 9, 2010].

(Continued)

*Primary Examiner* — David R Lazaro
*Assistant Examiner* — Mariegeorges A Henry
(74) *Attorney, Agent, or Firm* — Kowert, Hood, Munyon, Rankin & Goetzel, P.C.

(57) ABSTRACT

On-die functional blocks may use multiple communication networks to send requests and receive responses. For example, a first functional block may send a request via a first network. In response to receiving the request, a second functional block may respond to the first functional block via a second network. The second functional block may also send any requested data to the first functional block via a third network.

19 Claims, 8 Drawing Sheets

(56) References Cited

U.S. PATENT DOCUMENTS

| | | | |
|---|---|---|---|
| 7,987,313 B2 | 7/2011 | Chou et al. | |
| 7,992,122 B1 | 8/2011 | Burstein et al. | |
| 2003/0172189 A1* | 9/2003 | Greenblat | G06F 15/78 709/251 |
| 2004/0117554 A1* | 6/2004 | Raghavan | G06F 12/0813 711/118 |
| 2004/0139365 A1* | 7/2004 | Hosoya | G06F 11/2092 714/5.11 |
| 2006/0224659 A1* | 10/2006 | Yu | H04L 12/43 709/201 |
| 2007/0223396 A1* | 9/2007 | Bertram | H04L 41/12 370/254 |
| 2008/0186983 A1* | 8/2008 | Dielissen | H04L 47/10 370/400 |
| 2008/0205314 A1* | 8/2008 | Pecen | H04L 47/10 370/310 |
| 2010/0299428 A1 | 11/2010 | Shichino | |
| 2011/0082904 A1 | 4/2011 | Ebbes et al. | |
| 2012/0030310 A1 | 2/2012 | Gotz et al. | |
| 2012/0195321 A1 | 8/2012 | Ramanujam et al. | |
| 2012/0201171 A1 | 8/2012 | Ramanujam et al. | |
| 2012/0269071 A1* | 10/2012 | Cohen | H04L 12/1868 370/242 |
| 2014/0129753 A1 | 5/2014 | Schuette et al. | |
| 2014/0304355 A1* | 10/2014 | Kamath | H04L 67/2842 709/213 |

OTHER PUBLICATIONS

Mikkel B. Stensgaard and Jens Sparso, "ReNoC: A Network-on-Chip Architecture with Reconfigurable Topology", Second ACM/IEEE International Symposium on Networks-on-Chip, Apr. 7, 2008, 10 pages.

Network on Chip Architectures, University of Cagliari, Italy, http://www.diee.unica.it/eolab2/NoC.html, 2 pages. [retrieved Sep. 1, 2015].

Vasilis F. Pavlidis and Eby G. Friedman, "3-D Topologies for Networks-on-Chip", IEEE Transactions on Very Large Scale Integration (VLSI) Systems, vol. 15, No. 10, Oct. 2007, 10 pages.

Kees Goossens, "Networks on Chip", Electronic Systems Group, Faculty of Electrical Engineering Technical University Eindhoven, Netherlands, http://www.es.ele.tue.nl/~heco/courses/PlaffomDesign/NOC-KeesGoossens.pdf, 47 pages. [retrieved Sep. 1, 2015].

* cited by examiner

MULTIPLE ON-DIE COMMUNICATION NETWORKS

PRIORITY INFORMATION

The present application is a continuation of U.S. application Ser. No. 14/336,037, filed Jul. 21, 2014 (now U.S. Pat. No. 10,110,700), which claims priority to U.S. Provisional Appl. No. 61/972,886, filed Mar. 31, 2014; the disclosures of each of the above-referenced applications are incorporated by reference herein in their entireties.

BACKGROUND

Technical Field

Embodiments described here are related to computing systems, and more particularly, to the transmission of transactions between functional blocks within computing systems.

Description of the Related Art

Computing systems may include one or more systems-on-a-chip (SoC), which may integrate a number of different functions, such as, graphics processing, or multiple processing cores, onto a single integrated circuit. With numerous functions included in a single integrated circuit, improved computational performance and reduced power consumption may result.

To implement the desired functions on an SoC, one or more processors may be employed. Each processor may include a memory system with multiple levels of caches for providing low latency access to program instructions and operands. With multiple processors accessing multiple caches as well as main memory, the issue of cache coherency may arise. For example, a given data producer, such as, e.g., one of the processors, may write a copy of data in a cache, but the update to main memory's copy of the data may be delayed. In write-through caches, a write operation may be dispatched to memory in response to the write to the cache line, but the write is delayed in time. In a writeback cache, writes are made in the cache and not reflected in memory until the updated cache block is replaced in the cache (and is written back to main memory in response to the replacement).

In some computing systems, cache memories may be shared allowing multiple processors or processor cores to access a single cache memory. Requests to read data from or store data to a cache memory can result in significant communication traffic on a network between the various processors and their associated memories. Such traffic may result in congestion at points within the network which may limit computational performance while processors wait for responses to their respective requests.

SUMMARY OF THE EMBODIMENTS

Various embodiments for a circuit and method for transmitting transactions between a plurality of functional blocks of a computing system are disclosed. Broadly speaking, an apparatus and method are contemplated where a first functional block may be configured to send a request via a first communication network. A second functional block may be configured to send a response to the first functional block via a second communication network responsive to receiving the request. The second functional block may be further configured to send data to the first functional block via a third communication network responsive to a determination that the request includes a request for the data.

In one embodiment, a given functional block of the plurality of functional blocks is coupled to two adjacent functional blocks of the plurality of functional blocks via the first communication network. In another embodiment, the second communication network couples a given functional block to the remaining functional blocks of the plurality of functional blocks.

In a particular embodiment, the third communication network includes a plurality of stations. Each station may be configured to receive one or more data packets and send a given one of the received data packets to a given one of the functional blocks responsive to a determination that identification data included in the given one of the received one or more data packets matches an identifier of the given one of the functional blocks. Each station may be further configured to send the given one of the received one or more data packets to an adjacent station responsive to a determination that the identification data included in the given one of the received one or more data packets is different than the identifier of the given one of the functional blocks.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

To improve computational performance, a system-on-a-chip (SoC) may include multiple processors or processor cores. Each processor may employ a local cache memory to provide rapid access to local copies of instructions and operands. In some cases, a hierarchy of cache memories may be employed, and cache memories in the highest level of the hierarchy, such as, e.g., an L3 cache, may be shared between multiple processors or processor cores. To manage the various requests to a shared cache memory, the shared cache memory may be organized into multiple banks, and a crossbar switch may be used to connect a given processor or processor core to a given bank of the cache memory.

In such implementations, the use of a crossbar switch may not need to support a coherency protocol across the banks of the cache memory because the different banks cover different memory addresses. Moreover, a crossbar may allow for the connection of any processor to any bank in the cache memory. Circuitry and interconnect required to implement such a switch may be costly in terms of area and may not meet latency and bandwidth goals.

Partitioning the cache between processor cores or core clusters may allow for the cache to be closer to the core, thereby decreasing the access latency. In such a system, however, the multiple caches need to maintain coherency with respect to each other. The embodiments described herein may provide a transport infrastructure to support a suitable coherence protocol, as well as allowing for other traffic.

Typically a coherence protocol may broadcast a processor's request to other processor's caches. Each cache would send a response back to the requesting processor, and one of the caches my supply the cache line data itself. If the requested cache line is not found within the caches, then the protocol may initiate a request to the appropriate memory controller. To reduce memory latency, a memory controller may listen in to the broadcast to the caches so as to initiate a memory access speculatively, in case the cache line is not present in the caches. Various other operations, such as, e.g., evicting a cache line from a cache, may follow a somewhat different sequence, but the required network properties are essentially unchanged from those of a processor broadcasting a request.

A network suitable for use with such a protocol may support broadcasting or multicasting of requests, the return of a response from each request recipient to the initiator of the request, and a transfer of cache line data. Although the network may be optimized for such activity, in other embodiments, the network may be employed for other uses such as input or output transactions with peripheral devices, for example.

The embodiments illustrated in the drawings and described below may provide techniques for allowing coherent clients (or agents) to send requests to other clients, while providing fairness between clients in the presence of flow control, ensure unblocked, known and low latency concurrent responses by all clients, and provide high bandwidth data traffic.

System-On-a-Chip Overview

Figure 1:
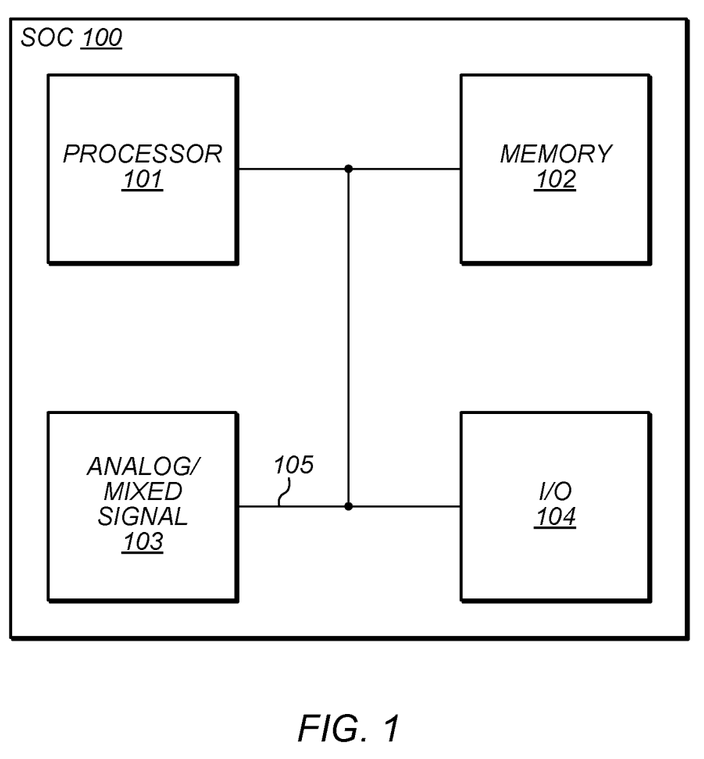
FIG. 1 illustrates an embodiment of a system on a chip.

A block diagram of an SoC is illustrated in FIG. 1. In the illustrated embodiment, SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone, or a server-based computing application, or any other suitable computing application. Transactions on internal bus 105 may be encoded according to one of various communication protocols. In some embodiments, intra-SoC communication may employ a proprietary protocol.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, Phase Change Memory (PCM), or a Ferroelectric Random Access Memory (FeRAM), for example. It is noted that in the embodiment of an SoC illustrated in FIG. 1, a single memory block is depicted. In other embodiments, any suitable number of memory blocks may be employed.

As described in more detail below, processor 101 may, in various embodiments, be representative of a general-purpose processor that performs computational operations. Processor 101 may process data and/or program instructions that may be stored in memory block 102.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators.

I/O block 104 may be configured to coordinate data transfer between SoC 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 101 and one or more devices (e.g., other computer systems or SoCs) coupled to SoC 101 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

SoCs, such as SoC 100, may be manufactured in accordance with one of various semiconductor manufacturing processes. During manufacture, transistors may be fabricated in a silicon substrate using a series of masking, deposition, and implantation steps. Once the transistors have been fabricated, they may be wired together to form various circuits, such as, e.g., logic gates, amplifiers, and the like. In order to wire the transistors together, multiple metal layers are deposited onto the silicon substrate, each layer separated by an insulating layer, such as, silicon dioxide, for example. Connections may be made from one metal layer to another by etching holes in one of the insulating layers and filling the hole with metal, creating what is commonly referred to as a "via."

Each metal layer may be fabricated using different materials, such as aluminum, copper, and the like, and may accommodate numerous individual wires. Due to differences in lithography between the various metal layers, different metal layers may allow for different minimum wire widths and spaces. Moreover, the different materials used for the different metal layers may result in different thickness of wires on the various metal layers. The combination of different widths, spaces, and thickness of wires on the different metal layers may result in different physical characteristics, such as resistance, capacitance, and inductance, between wires on different metal layers. The different physical characteristics of the various wires could result in different time constants (i.e., the product of the resistance of a wire and the capacitance of a wire). Wires with smaller time constants are able to handle higher frequency data transmission than wires with larger time constants. In some designs, wires fabricated on the top most levels of metals are thicker, wider, and have smaller time constants, making such wires attractive for high speed data transmission. The wires fabricated on the top most levels of metal may also have larger wire-to-wire spacing (or "pitch") than those wires fabricated on lower levels of metal. As such, a number of available wires on lower levels of metal may be greater than a number of wires available on the top metal layers.

Figure 2:
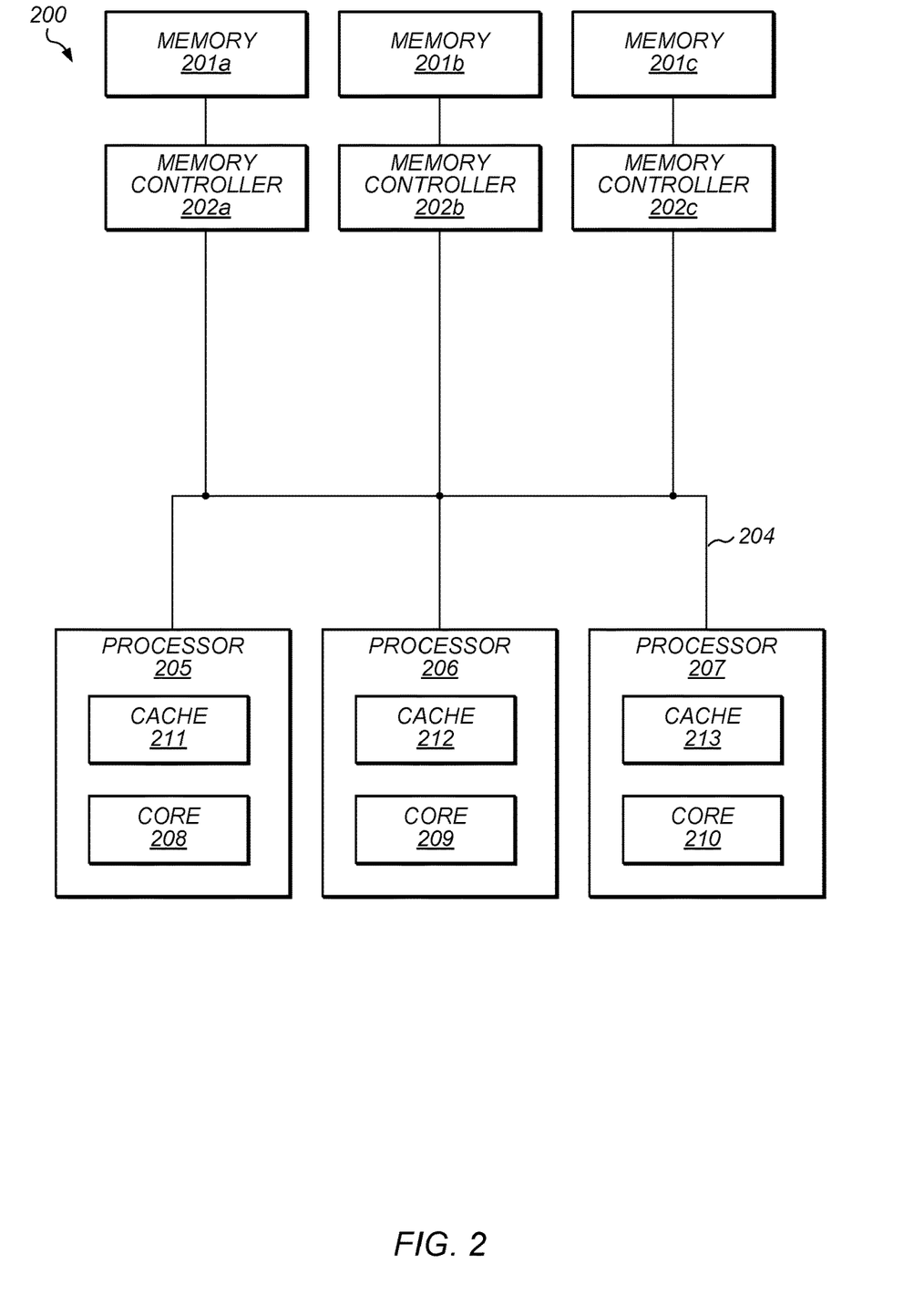
FIG. 2 illustrates another embodiment of a system on a chip.

Turning to FIG. 2, another embodiment of an SoC is depicted. In the illustrated embodiment, SoC 200 includes a memories 201a-c, memory controllers 202a-c, and processors 205, 206, and 207. Processor 205 includes processor core 208 and cache memory 211. Similarly, processor 206 includes processor core 209 and cache memory 212, and processor 207 includes processor core 210 and cache memory 213.

Each of processors 205, 206, and 207 are coupled to memory controllers 202a-c through bus 204. It is noted that although only three processors, three memory controllers, and three memories are depicted, in other embodiments, different numbers of processors, memory controllers, and memories, as well as other functional blocks (also referred to herein as "agents") may be coupled to bus 204. In some embodiments, bus 204 may correspond to bus 105 of SoC 100 as illustrated in FIG. 1. Bus 204 may be encoded in one of various communication protocols that may support the transmission of requests and responses between processors 205, 206 and 207, and memory controllers 202a-c. Bus 204 may, in various embodiments, include multiple networks. For example, bus 204 may include a ring network, a point-to-point network, and a store-and-forward network. As described below in more detail, different types of communications, such as, e.g., requests, may be transmitted over different networks. It is noted that although bus 204 is depicted as coupling processors to memory controllers, in other embodiments, a similar type of bus may be employed to couple multiple processing cores to a hierarchy of cache memories, or other functional blocks, within a single processor.

Each of memories 201a-c may, in some embodiments, include one or more DRAMs, or other suitable memory device. Each of memories 201a-c is coupled to a respective one of memory controllers 202a-c, each of which may be configured to generate control signals necessary to perform read and write operations to the corresponding memory. In some embodiments, memory controllers 202a-c may implement one of various communication protocols, such as, e.g., a synchronous double data rate (DDR) interface.

Each of memory controllers 202a-c and processors 205, 206, and 207 may be configured to receive requests and responses and data (collectively referred to as "packets") from processors 205, 206, and 207. Each received packet may be evaluated in order to maintain coherency across cache memories 211, 212, and 213, and memories 201a-c. Coherency may be maintained using one of various coherency protocols types such as, e.g., Modified Share Invalid (MSI) protocol, Modified Owned Exclusive Shared Invalid (MOESI) protocol, or any other suitable coherency protocol type. In some embodiments, a specialized functional block may be configured to implement the chosen coherency protocol.

Cache memories 211, 212, and 213 may be designed in accordance with one of various design styles. For example, in some embodiments, cache memories 211, 212, and 213 may be fully associative, while in other embodiments, the cache memories may be direct-mapped. Each entry in the cache memories may include a "tag" (which may include a portion of the address of the actual data fetched from main memory).

It is noted that embodiment of an SoC illustrated in FIG. 2 is merely an example. In other embodiments, different numbers of processors and other functional blocks may be employed.

On-Die Communication

As described above in regard to FIG. 2, the functional blocks or agents within a computing system may be coupled together by multiple networks. Each network may have a different topology and may make use of different groups of the available metal layers within the integrated circuit or die. Different types of communication may be assigned to different networks. For example, an initial request of a transaction may be sent via a ring network coupling the various agents, while the corresponding response of the transaction may be sent via a point-to-point network coupling the various agents. The partitioning of different types of communication to different networks may, in various embodiments, improve communication bandwidth or latency between the various agents.

Figure 3:
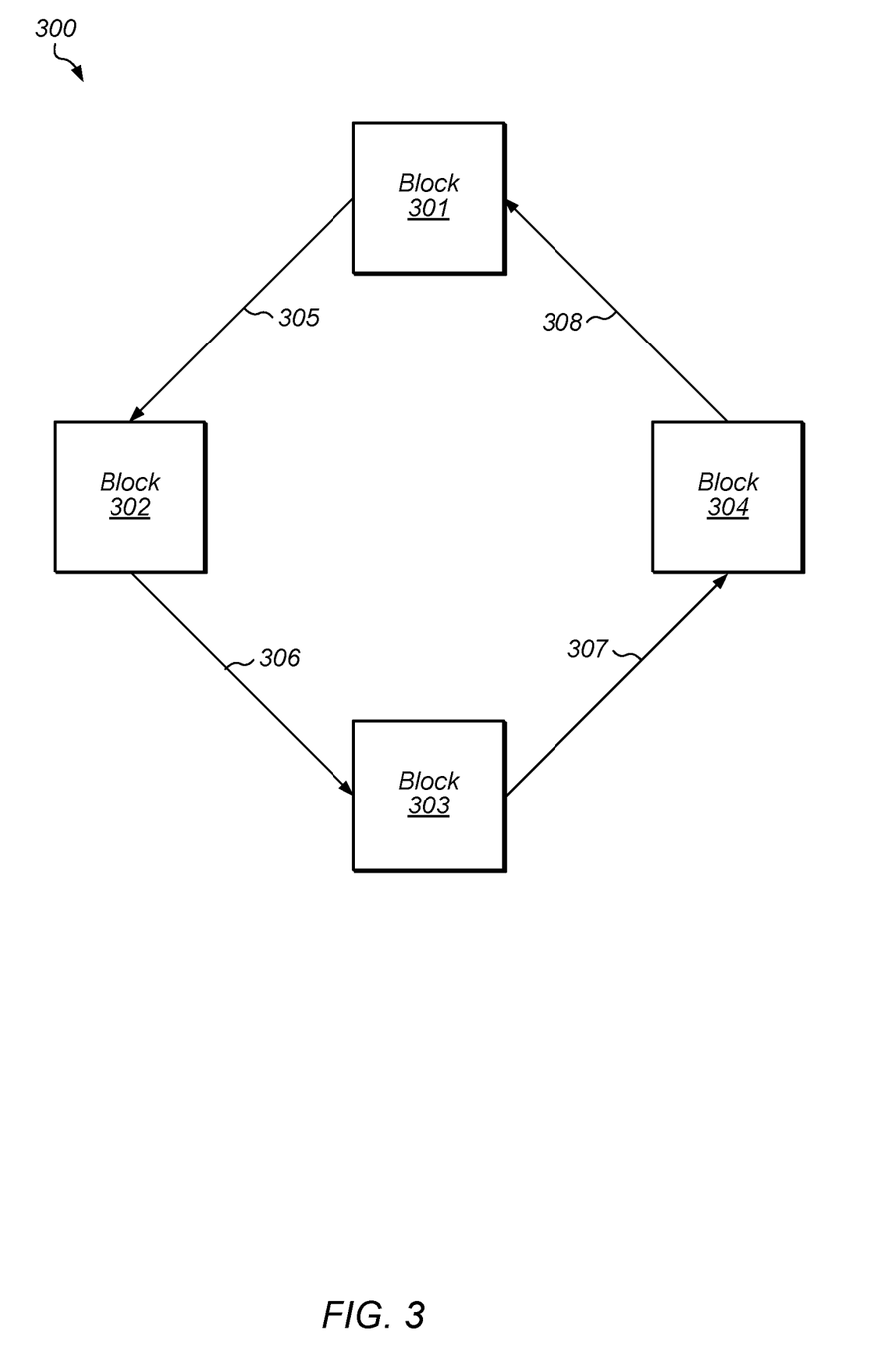
FIG. 3 illustrates a block diagram of an embodiment of a ring network.

Turning to FIG. 3, a block diagram of an embodiment of a ring network is illustrated. In some embodiments, ring network 300 may correspond to one of networks 204 as illustrated in FIG. 2. In the illustrated embodiment, ring network 300 includes functional blocks 301 through 304. Functional block 301 is coupled to functional block 302 via network connection 305, respectively. In a similar fashion, functional block 302 is coupled to functional block 303 via network connection 306, functional block 303 is coupled to functional block 304 via network connection 307, and functional block 304 is coupled to functional block 301 via network connection 308. Although only four functional blocks are depicted in the embodiment illustrated in FIG. 3, any suitable number of functional blocks may be employed. Each of the illustrated functional blocks may, in various embodiments, correspond to a processor, processor core, memory controller, or any suitable functional block. Packets may propagate quickly on a ring because each functional block can pick up a copy as the packet passes through; no buffering is required in the ring between functional blocks. Because any transmitted packet is typically sent around the entire ring once, it may be seen by any or all of the functional blocks; thus the ring may be suitable for broadcasting or multicasting a packet to multiple functional blocks During operation, packets may travel from one functional block to another, such as from functional block 301 to functional block 302, for example. Such data packets may correspond to a request for information from a given block or any other suitable type of communication. Each functional block may examine packets as they travel from one functional block to another. Packets may be encoded with information identifying (an) intended recipient(s). When a functional block receives a packet, the functional block may examine any encoded information to determine if it is an intended recipient. The functional block may forward the packet onto an adjacent functional block. If the functional block determines it is an intended recipient, it may perform any tasks relating to a request encoded in the packet, and respond accordingly. As described below in more detail, the response may, in some embodiments, be made via a separate network. If a functional block sees a packet sent by itself, it may remove the packet from the ring, i.e., not send it to the next functional block. In some embodiments, the speed of this process may be improved by having the sender of the packet waiting for the propagation time of the packet around the ring and removing the packet without examining it.

Packets may travel in a single direction around the ring. For example, in the illustrated embodiment, packets may travel in a counter-clockwise fashion, i.e., from functional block 301 to functional block 302, then to functional block 303, as so forth. In other embodiments, a secondary ring may be included in which packets travel in the opposing direction. Bandwidth may be increased, in other embodiments, by including multiple rings in each or either direction. Each packet may be formatted in accordance with a suitable protocol.

In some embodiments, network connections 305 through 308 may be implemented using upper levels of metallization that available as part of semiconductor manufacturing process. Such upper metal layers may, in various embodiments, have a time constant less than lower levels of metallization, thereby allowing faster signal propagation than the lower levels of metallization. Fast propagation may be especially relevant to ring networks, where the signal propagation distance may be greater than physical distance (such as communication from block 301 to block 304). Although each network connection illustrated in FIG. 3 is depicted as a single line, in various embodiments, each network connection may include multiple wires implemented on the selected metal layer(s).

In some embodiments, a sent packet may correspond to a request, such as was described above in regard to FIG. 3. The requesting processor may have no information regarding if or where any requested data is cached. In such cases, by multicasting a request to all caches 211, 212 and 213, the requesting processor may find any cached copy. In the absence of a cached copy the processor may send a request to the appropriate memory controller 202a, 202b, or 202c.

It is noted that the embodiment illustrated in FIG. 3 is merely an example. In other embodiments, different numbers of functional blocks and different communication protocols may be employed.

Figure 4A:
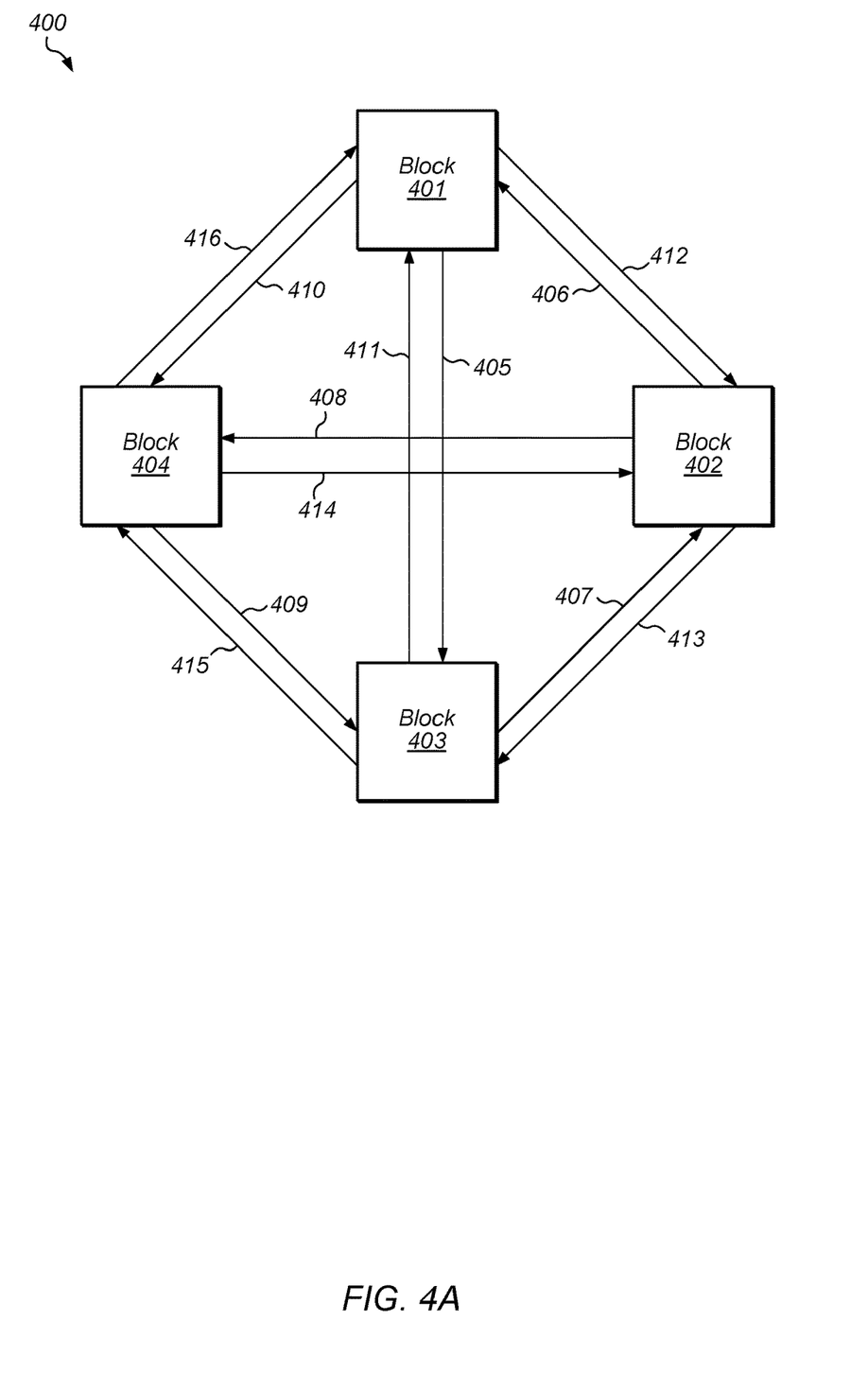
FIG. 4A illustrates a block diagram of an embodiment of a point-to-point network.

A block diagram depicting an embodiment of a point-to-point network is illustrated in FIG. 4A. In some embodiments, point-to-point network 400 may correspond to one of networks 204 as illustrated in FIG. 2. In the illustrated embodiment, point-to-point network 400 includes functional blocks 401 through 404, and network connections 405 through 416. Packets transferred using one of network connections 405 through 416 may be encoded in accordance an implemented protocol.

In the illustrated embodiment, each one of functional blocks 401 through 404 is coupled to the remaining functional blocks. For example, functional block 401 is coupled to functional blocks 402, 403, and 404 via network connections 412, 405, and 410, respectively. In a similar fashion, the other functional blocks are coupled together. Although each of network connections 405 through 416 are depicted as a single connection in the illustrated embodiment, each network connections may include multiple wires. In some embodiments, the wires may be fabricated on a set of metal layers that have a larger time constant than top-level metal layers and smaller than bottom-level metal layers.

When a functional block receives a response to a request, the functional block may prepare to receive any requested data, such as, e.g., a cache line or the like. In some embodiments, the requested data may be delivered via a store-and-forward network as described below in more detail.

It is noted that the embodiment illustrated in FIG. 4A is merely an example. In other embodiments, different numbers of connections between each of the functional blocks are possible and contemplated.

Figure 4B:
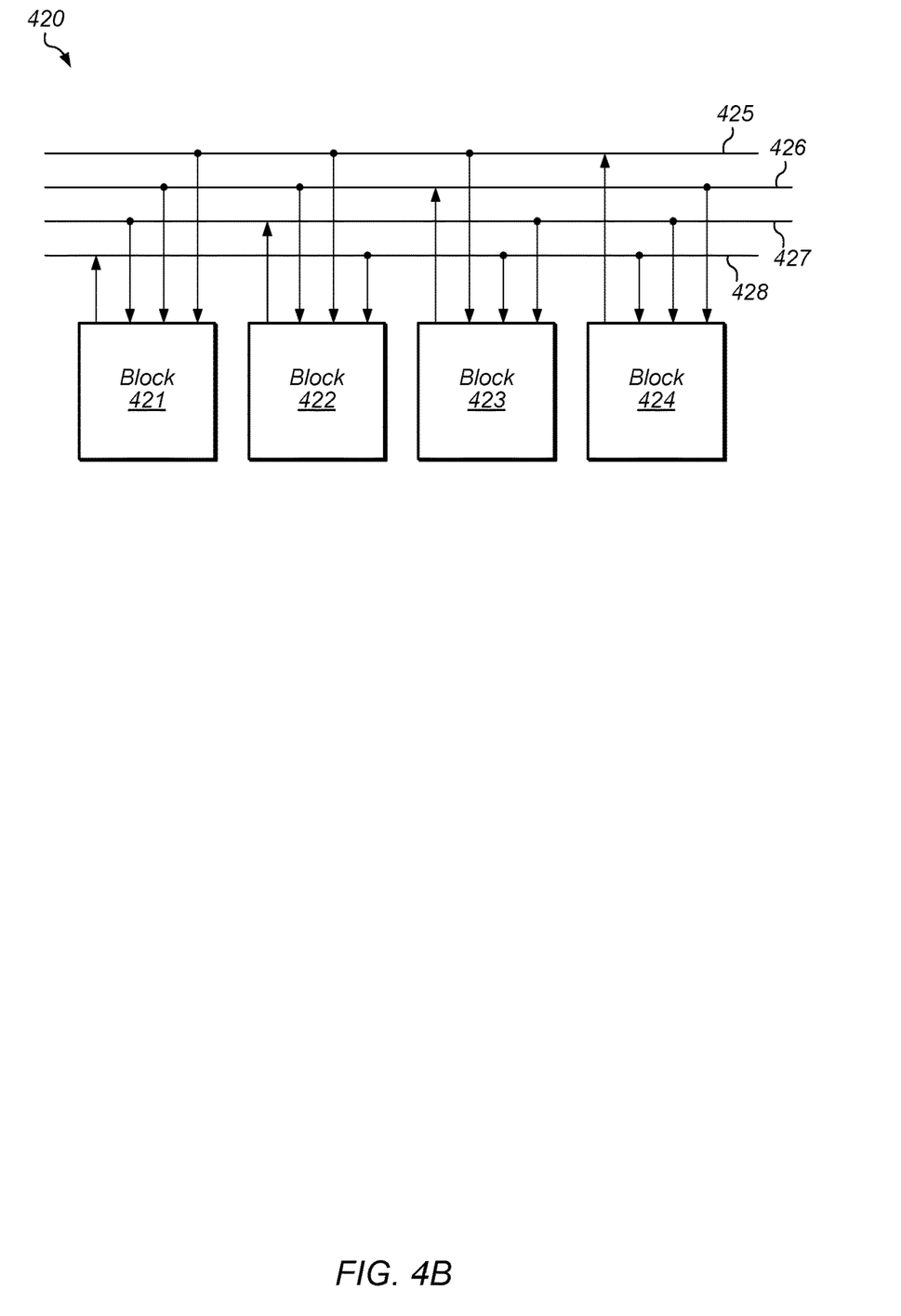
FIG. 4B illustrates a block diagram of another embodiment of a point-to-point network.

Another embodiment of a point-to-point network is illustrated in FIG. 4B. In some embodiments, point-to-point network 420 may correspond to one of networks 204 as illustrated in FIG. 2. In the illustrated embodiment, point-to-point network 420 includes functional blocks 421 through 424, and network connections 425 through 428. Packets transferred using one of network connections 425 through 428 may be encoded in accordance an implemented protocol.

In the illustrated embodiment, a given functional block may send packets to the remaining functional blocks via a network connection. The sent packets may include information indicating an intended recipient. For example, functional block 421 may send packets to each of functional blocks 422, 423, and 424, When the remaining functional blocks receive the packet, only the intended recipient accepts the packets while the other functional blocks ignore the packets. Since a functional block may only receive one request at a time from a ring network, such as, e.g., ring network 300, the functional block may only need to send one response at a time. As such, a restriction on the number of outputs from a given function block, such as is illustrated in FIG. 4B, may, in various embodiments, not result in bottleneck within the given functional block.

It is noted that although each of network connections 425 through 428 are depicted as a single connection in the illustrated embodiment, each network connection may include multiple wires. In some embodiments, the wires may be fabricated on a set of metal layers that have a larger time constant than top-level metal layers and smaller than bottom-level metal layers.

While only for functional blocks are depicted in the embodiment illustrated in FIG. 4B, it is noted that any suitable number of functional blocks may be employed.

Figure 5:
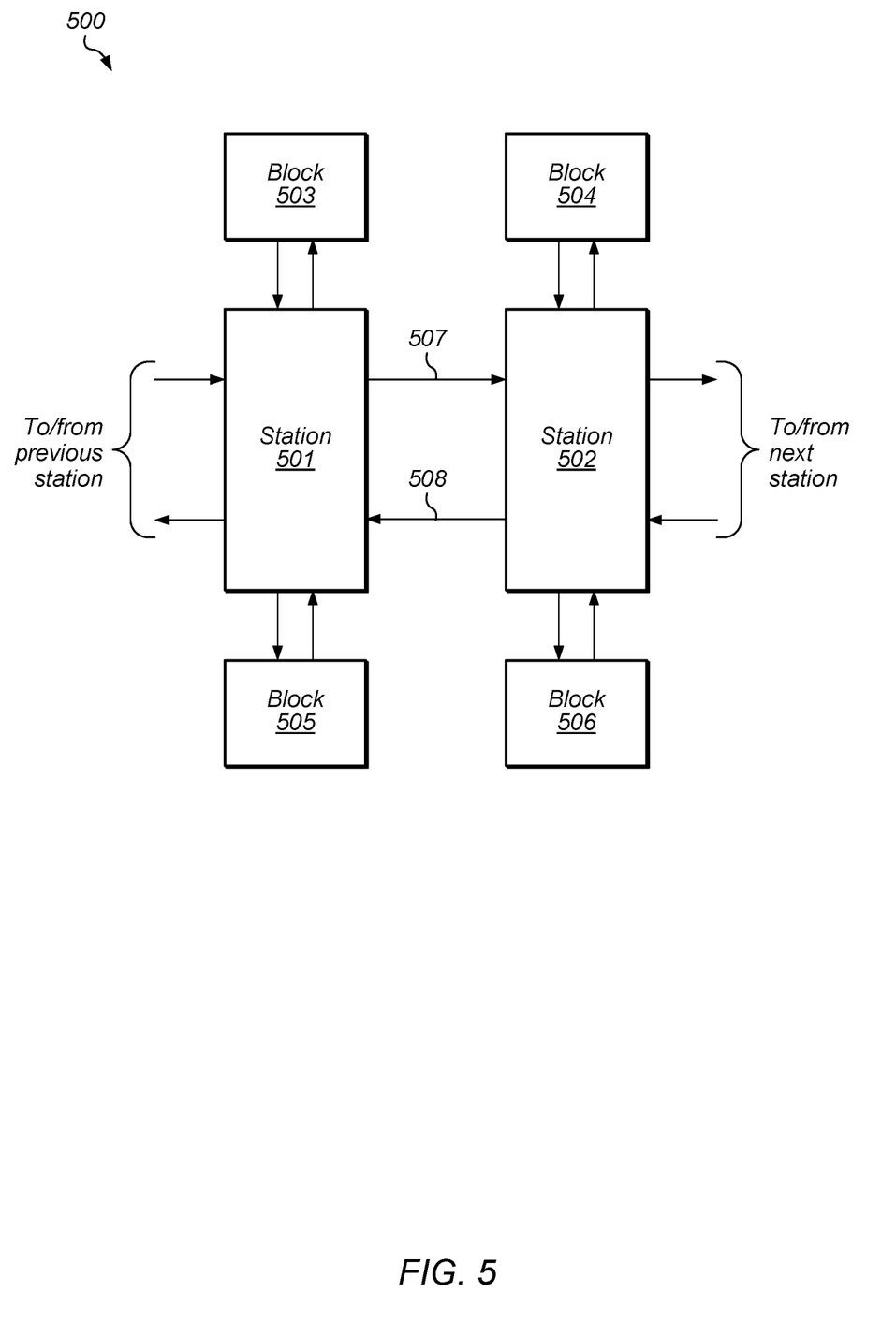
FIG. 5 illustrates a block diagram of an embodiment of a store-and-forward network.

Turning to FIG. 5, an embodiment of a store-and-forward network is illustrated. Store-and-forward network 500 may, in various embodiments, correspond to one of networks 204 as illustrated in FIG. 2. In the illustrated embodiment, store-and-forward network 500 includes functional blocks 503 through 506, and stations 501 and 502. Stations 501 and 502 are coupled via network connections 507 and 508. In some embodiments, station 502 may send data packets to station 501, i.e., westbound data packets, via network connection 507, and station 501 may send data packets to station 502, i.e., eastbound data packets, via network connection 508. It is noted that although only two stations are shown, in other embodiments, additional stations, each coupled to additional functional blocks, may be employed.

Each of network connections 507 and 508 may include multiple wires. In some embodiments, the wires may be manufactured on the lower metal layers and have a higher time constant than wires constructed on the uppermost layers available on a semiconductor processor. Because lower level wires may be constructed on a finer pitch than the upper level wires, lower level wires may offer greater bandwidth for a given area at the cost of lower propagation speed.

During operation, one of functional blocks 503 through 506 may send data in response to functional block responsive to a request. The request may have been initially send via a ring network, such as, e.g., ring network 300, and an acknowledgement to the request sent via a point-to-point network, such as, e.g., point-to-point network 400. The requested data may include one or more data packets. Each of the one or more data packets may be encoded with information indicating an intended recipient. The data packets to be sent may be transmitted on either the westbound or eastbound paths through the network dependent upon the desired destination. For example, if functional block 505 needs to send data to block 506, data packets may be transmitted on eastbound network connection 508.

Data packets may be initially transmitted from a functional block to a station, such as, station 501, for example. The station may be placed in a buffer, then examined encoding within the data packets to determine where the data packets are to be sent. This process of buffering data packets, and then sending the buffered packets to a next stage in commonly referred to as "store and forward." As data packets are received at a station, the encoded information is examined, and the station will send the data to a functional block coupled to the station, or forward the data onto a next station. For example, data packets received at station 502 via network connection 508 may be buffered and then sent to either block 504, block 506, or onto another station (not shown), dependent upon destination information encoded in the data packets. In some embodiments, repeater circuits (not shown), such as a pair of inverters, may be used between stations to allow the transmission of data packets over greater distances.

It is noted that static complementary metal-oxide-semiconductor (CMOS) inverters, such as those shown and described herein, may be a particular embodiment of an amplifier that may be employed in the circuits described herein. However, in other embodiments, any suitable amplifier may be used, including amplifiers built using technology other than CMOS.

Moreover, buffers, such as those shown and described herein may be a particular embodiment of a memory circuit configured to store data for a period of time. A buffer may be configured to be a First-in First-out (FIFO), Last-in First-out (LIFO), or any other suitable configuration. In some embodiments, a buffer may include multiple static or dynamic data storage cells. Each data storage cell may include a single multi-function port, or dedicated read and write ports.

It is noted that the embodiment illustrated in FIG. 5 is merely an example. In other embodiments, different numbers of stations and different configurations of connections between stations are possible and contemplated.

Figure 6:
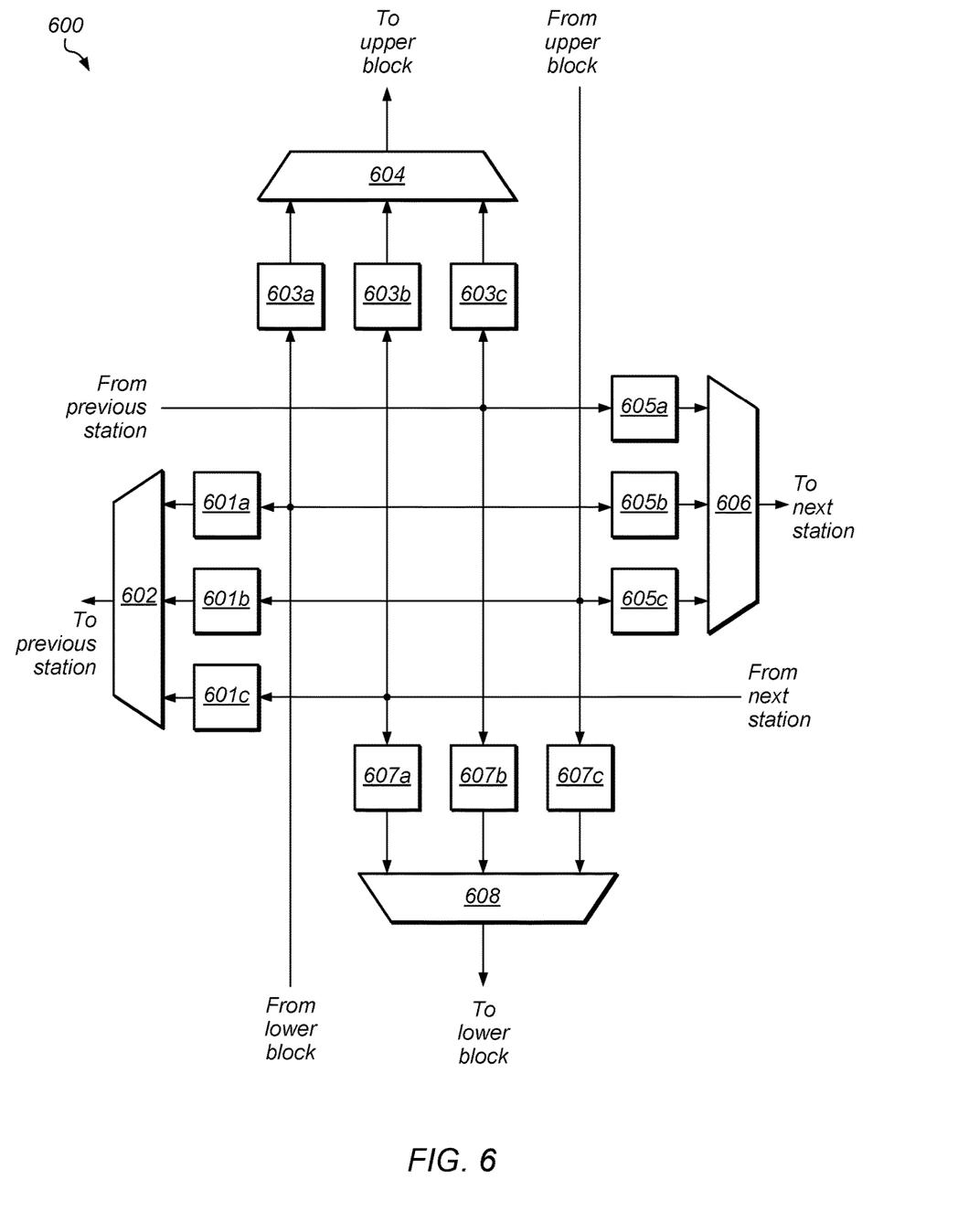
FIG. 6 illustrates a block diagram of an embodiment of a store-and-forward network station.

An embodiment of a network station is illustrated in FIG. 6. Station 600 may, in various embodiments, correspond to stations 501 and 502 of mesh network 500 as illustrated in FIG. 5. In the illustrated embodiment, station 600 includes buffers 601a-c, 603a-c, 605a-c, and 607a-c. Station 600 also includes multiplex units 602, 604, 606, and 608. Multiplex unit 602 is coupled to the outputs of buffers 601a-c, multiplex unit 604 is coupled to the outputs of buffers 603a-c. multiplex unit 606 is coupled to the output of buffers 605a-c, and multiplex unit 608 is coupled to the output of buffers 607a-c.

Each of buffers 601a-c, 603a-c, 605a-c, and 607a-c, may be configured to store one or more data packets. Although the input connections to the buffers are shown as single connections, in various embodiments, each connection may include multiple data bits, and the buffers may be capable of storing and retrieving multiple data bits in a parallel fashion. In some embodiments, circuitry within buffers 601a-c, 603a-c, 605a-c, and 607a-c may be organized on a per bit basis, i.e., all circuitry pertaining to a given data bit may be grouped together (commonly referred to as a "bit slice"). The individual bit slices are arranged together to store and forward a complete data word. In some embodiments, bit slices oriented in a horizontal direction may be used for buffers 601a-c and 605a-c, while bit slices organized in a vertical fashion may be employed for buffers 603a-c and 607a-c. Further, both horizontal and vertical bit slice organizations may be applied at the same time. The use of a bit slice topology for the circuitry within station 600 may, in some embodiments, reduce wiring complexity, and, therefore, parasitic wiring load, thereby improving performance.

Multiplex units 602, 604, 606, and 608 are each configured to select packets data packets from their respective group of buffers. Stored data packets may be selected from an appropriate buffer by the aforementioned multiplex units, and forwarded onto their respective destinations in a First-in First-out fashion, or by another other suitable arbitration method. Each multiplexer may select between buffers within its group using round-robin, or any other suitable arbitration method, taking into account the availability of buffer space downstream from the multiplexer.

During operation, data packets traveling on network connection 609 may be received at buffers 603c, 605a, and 607b. In some embodiments, network connection may be coupled to a preceding network station, such as, station 501 as illustrated in FIG. 5, for example. Dependent upon destination information encoded in the data packets, the packets may then be buffered by an appropriate one of the aforementioned buffers. For example, if a received data packet is intended for the upper functional block coupled to station 600, the received data packet will be stored in buffer 603c for later delivery to the upper functional block. On the other hand, if the received functional block is not intended for delivery to either the upper or lower functional block coupled to station 600, then the received functional block may be stored in buffer 605a for transmission to an adjacent station at a later time.

In a similar fashion, data packets received from network connection 611 may also be stored in an appropriate one of buffers 607a, 601c, and 603b. Data packets received from the upper block coupled to station 600 may arrive via network connection 610 and stored in an appropriate one of buffers 607c, 605c, and 601b. Data packets arriving via network connection 612 from the lower block connected to station 600 may be stored in an appropriate one of buffers 603a, 601a, and 605b.

The embodiment illustrated in FIG. 6 is merely an example. In other embodiments, different circuits and different configurations of circuits may be employed.

Figure 7:
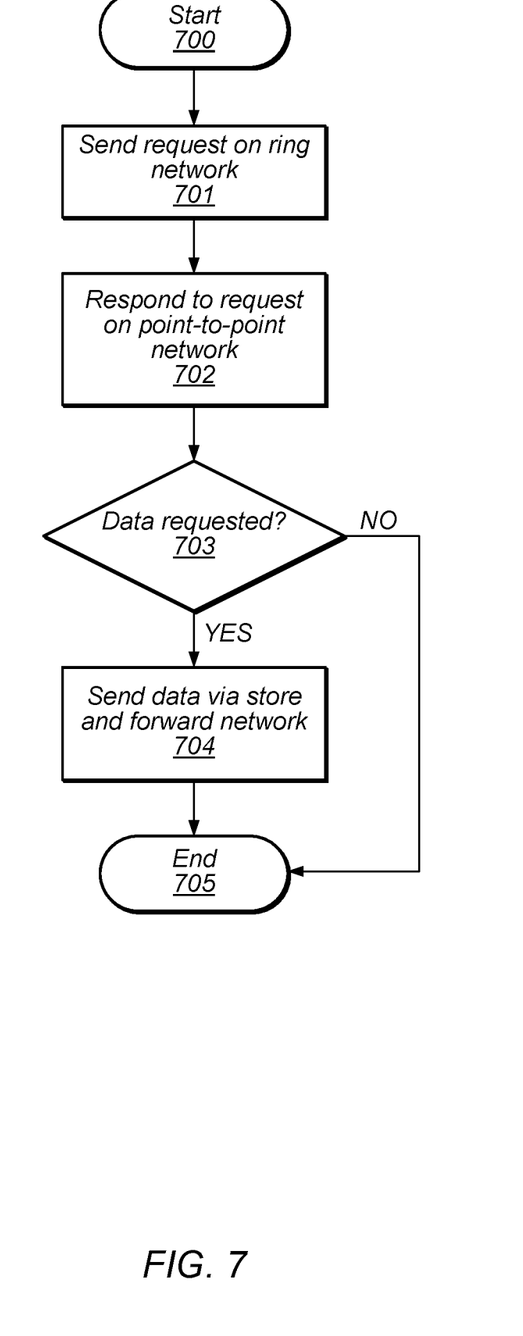
FIG. 7 illustrates a flow diagram depicting an embodiment of a method for operation a computing system.

Turning to FIG. 7, a flow chart depicting an embodiment of a method for operating a computing system is illustrated. The method begins in block 700. A functional block of the computing system may send a request through a ring network, such as, ring network 300 as illustrated in FIG. 3 (block 701). The request may be part of a complete transaction between the functional block and another functional block or agent of the computing system. For example, a processor such as, e.g., processor 205 of FIG. 2, may request information stored in a memory, such as, e.g., memory 201c of FIG. 2. The request may travel to each agent connected to the ring network until it reaches all intended recipients or it may travel around the entire ring.

Once an intended recipient has received the request, the recipient may then send a response to the requesting functional block via a point-to-point network such as, e.g., point-to-point network 400 as illustrated in FIG. 4A or FIG. 4B (block 702). The response may, in various embodiments, be an acknowledgement that the request was received.

The method may then depend on if data was requested as part of the original request (block 703) or if the responses indicate that data is being delivered. If no data is delivered, the method may then conclude in block 705. If data is delivered, then a recipient may send the data via a store-and-forward network, such as, e.g., store-and-forward network 500 as illustrated in FIG. 5 (block 704). The recipient may send the data as multiple data packets. In some embodiments, the data packets may be encoded with identification information corresponding the requesting functional block. Stations included in the store-and-forward network may use such encoded information to route the data packets to the requesting functional block. As the data packets are routed through the stations, the data may be buffered before sending from one station to another. When the data packets reach the station coupled to the requesting functional block, the data packets may again be buffered before being sent to the requesting functional block. Once the data has been sent to the requesting functional block, the method may conclude in block 705. By sending the request, the response(s), and any requested data, over separate networks the computing system may, in some embodiments, ensure forward progress of the various agents of the computing system in the presence of flow control, and may ensure unblocked, known and low latency, concurrent responses by all agents.

Although the operations illustrated in FIG. 7 are depicted as being performed in a sequential fashion, one or more of the operations may be performed in parallel.

Numerous variations and modifications will become apparent to those skilled in the art once the above disclosure is fully appreciated. It is intended that the following claims be interpreted to embrace all such variation and modifications.

What is claimed is:

1. An apparatus, comprising:
a set of functional circuit blocks and a plurality of connections on a common integrated circuit, wherein the set of functional circuit blocks includes three or more functional circuit blocks coupled to one another by the plurality of connections, wherein the plurality of connections includes:
a first set of connections that form a ring network that permits functional circuit blocks to communicate with one another via intermediate functional circuit blocks; and
a second set of connections that form a point-to-point network, wherein the second set of connections includes dedicated connections between each pair of the set of functional circuit blocks configured to relay responses to requests transmitted via the ring network;
wherein a given functional circuit block of the set of functional circuit blocks is configured to:
broadcast, via the ring network, a given data request to remaining ones of the set of functional circuit blocks; and
in response to receiving, via the ring network, a different data request from a different functional circuit block of the set of functional circuit blocks and determining that the given functional circuit block is an intended recipient of the different data request:
send a response to the different functional circuit block using a particular dedicated connection of the second set of connections of the point-to-point network, wherein the particular dedicated connection is between the given functional circuit block and the different functional circuit block.

2. The apparatus of claim 1, wherein the set of functional circuit blocks are further coupled to one another via a third set of connections that form a store and forward network, and wherein the given functional circuit block is further configured to send data specified in the different data request to the different functional circuit block using the store and forward network.

3. The apparatus of claim 2, wherein the store and forward network includes a plurality of station units including a particular station unit configured to:
receive one or more data packets from the given functional circuit block; and
store the one or more data packets.

4. The apparatus of claim 3, wherein the particular station unit is further configured to send a given one of the one or more data packets to the different functional circuit block in response to a determination that identification data included in the given one of the one or more data packets matches an identifier of the different functional circuit block.

5. The apparatus of claim 3, wherein the particular station unit is further configured to send a given one of the one or more data packets to a different storage unit of the plurality of station units, in response to a determination that identification data included in the given one of the one or more data packets is different than an identifier of the different functional circuit block.

6. A method, comprising:
sending, by a first functional circuit block of a set of functional circuit blocks that includes three or more functional circuit blocks on a common integrated circuit, a data request to a second functional circuit block of the set of functional circuit blocks via at least one intermediate functional circuit block that is coupled between the first functional circuit block and the second functional circuit block using a first set of connections that form a ring network on the common integrated circuit;
sending, by the second functional circuit block, a response to the first functional circuit block using a particular dedicated connection of a second set of connections that form a point-to-point network on the common integrated circuit, wherein the point-to-point network is coupled the set of functional circuit blocks and is configured to relay responses to requests transmitted via the ring network, wherein the second set of connections includes dedicated connections between each pair of the set of functional circuit blocks, and wherein the particular dedicated connection is between the first functional circuit block and the second functional circuit block; and sending, by the second functional circuit block, data specified in the data request to the first functional circuit block via a third set of connections that form a store and forward network on the common integrated circuit, wherein the store and forward network is coupled to the set of functional circuit blocks.

7. The method of claim 6, wherein sending the data specified in the data request includes sending one or more data packets to a particular station unit of a plurality of station units included in the store and forward network.

8. The method of claim 7, further comprising, storing, by the particular station unit, the one or more data packets.

9. The method of claim 8, wherein a given one of the one or more data packets includes a complete data word.

10. The method of claim 8, further comprising, sending, by the particular station unit, a given one of the one or more data packets to the first functional circuit block in response to determining that identification data included in the given one of the one or more data packets matches an identifier of the first functional circuit block.

11. The method of claim 8, further comprising, sending, by the particular station unit, a given one of the one or more data packets to a different storage unit of the plurality of station units, in response to determining that identification data included in the given one of the one or more data packets is different than an identifier of the first functional circuit block.

12. The method of claim 8, further comprising, subsequent to storing the one or more data packets, selecting a given one of the one or more data packets in a first-in first-out fashion for forwarding to another station unit of the plurality of station units.

13. The method of claim 8, further comprising, subsequent to storing the one or more data packets, selecting a given one of the one or more data packets based on an availability of storage space in another station unit of the plurality of station units.

14. An apparatus, comprising:
a plurality of cache memory circuits included on a common integrated circuit, wherein the plurality of cache memory circuits are coupled to one another via a first set of connections that form a ring network and a second set of connections that form a point-to-point network configured to relay responses to requests transmitted via the ring network; and a processor circuit coupled to the plurality of cache memory circuits using the first set of connections and the second set of connections, wherein the processor circuit is configured to a data request to a particular cache memory circuit via at least one intermediate cache memory circuit using the first set of connections; and wherein the second set of connections includes dedicated connections between the processor circuit and given ones of the plurality of cache memory circuits; and wherein the particular cache memory circuit of the plurality of cache memory circuit is configured to send a response to the processor circuit using a particular dedicated connection of the second set of connections, wherein the particular dedicated connection is between the processor circuit and the particular cache memory circuit.

15. The apparatus of claim 14, wherein the plurality of cache memory circuits and the processor circuit are further coupled to one another via a third set of connections that form a store and forward network, wherein the particular cache memory circuit is further configured to send data specified in the data request to the processor circuit using the store and forward network.

16. The apparatus of claim 15, wherein the store and forward network includes a plurality of station units including a particular station unit configured to:
receive one or more data packets from the particular cache memory circuit; and
store the one or more data packets.

17. The apparatus of claim 16, wherein the particular station unit is further configured to send a given one of the one or more data packets to the processor circuit in response to a determination that identification data included in the given one of the one or more data packets matches an identifier of the processor circuit.

18. The apparatus of claim 16, wherein the particular station unit is further configured to send a given one of the one or more data packets to a different storage unit of the plurality of station units, in response to a determination that identification data included in the given one of the one or more data packets is different than an identifier of the processor circuit.

19. The apparatus of claim 16, wherein the processor circuit, the plurality of cache memory circuits, the ring network, the point-to-point network, and the store and forward network are fabricated on a single integrated circuit.

* * * * *